United States Patent
Li et al.

(10) Patent No.: US 9,621,633 B2
(45) Date of Patent: Apr. 11, 2017

(54) FLOW DIRECTOR-BASED LOW LATENCY NETWORKING

(71) Applicant: Intel Corporation, Santa Clara, CA (US)

(72) Inventors: Yadong Li, Portland, OR (US); Anil Vasudevan, Portland, OR (US); Linden Cornett, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 13/836,959

(22) Filed: Mar. 15, 2013

(65) Prior Publication Data

US 2014/0280709 A1 Sep. 18, 2014

(51) Int. Cl.
G06F 15/16 (2006.01)
H04L 29/08 (2006.01)
G06F 13/38 (2006.01)

(52) U.S. Cl.
CPC ............ *H04L 67/10* (2013.01); *G06F 13/385* (2013.01)

(58) Field of Classification Search
CPC ...................................... H04L 67/10
USPC ........................ 709/217, 200, 220
See application file for complete search history.

(56) References Cited

U.S. PATENT DOCUMENTS

| | | | |
|---|---|---|---|
| 7,360,217 B2 * | 4/2008 | Melvin et al. | 718/102 |
| 8,539,489 B2 * | 9/2013 | Ding | 718/100 |
| 2004/0215944 A1 | 10/2004 | Burky et al. | |
| 2006/0045090 A1 * | 3/2006 | Ronciak | H04L 12/5693 370/392 |
| 2006/0203730 A1 | 9/2006 | Zur | |
| 2007/0133566 A1 | 6/2007 | Copps | |
| 2013/0138760 A1 * | 5/2013 | Tsirkin | 709/213 |
| 2014/0032796 A1 * | 1/2014 | Krause | G06F 12/0831 710/29 |
| 2014/0310369 A1 * | 10/2014 | Makhervaks et al. | 709/207 |

OTHER PUBLICATIONS

International Search Report and Written Opinion received for PCT Patent Application No. PCT/US2014/019260, mailed on May 30, 2014, 9 Pages.
International Preliminary Report on Patentability received for PCT Patent Application No. PCT/US2014/019260, mailed Sep. 24, 2015.

* cited by examiner

*Primary Examiner* — El Hadji Sall
(74) *Attorney, Agent, or Firm* — Grossman, Tucker, Perreault & Pfleger, PLLC

(57) ABSTRACT

Generally, this disclosure relates to low latency networking. A system may include processor circuitry comprising at least one processor; memory circuitry configured to store an application, a receive queue and a networking stack comprising a network device driver; a network controller comprising a flow director, the network controller configured to couple the host device to at least one link partner and the flow director configured to store one or more selected received packets in the receive queue, the selecting based, at least in part, on a packet flow identifier; and a network device driver configured to identify the receive queue in response to a polling request comprising the packet flow identifier; poll the receive queue; and process each received packet stored in the receive queue.

22 Claims, 2 Drawing Sheets

FLOW DIRECTOR-BASED LOW LATENCY NETWORKING

FIELD

The present disclosure relates to low latency networking, and, more particularly, to flow director-based low latency networking.

BACKGROUND

Financial Service Industry applications and new data center designs may require low latency and predictability (i.e., low jitter) in data communications. A traditional networking stack, e.g., TCP/IP, may provide good compatibility for socket-based applications but latency remains a challenging issue. An application may be configured to poll for received packets in order to reduce latency. Even with polling by the application, device interrupts and DPC (delayed procedure call) scheduling for each interrupt may occur when packet(s) are received since a network device driver is typically unaware of polling by the application and may not disable interrupts. Both interrupt context switching and DPCs introduce varying delays that may increase latency and/or increase latency variation (i.e., jitter).

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to flow director-based low latency networking. A method and system are configured to implement polling by a network device driver. A logical link controller is configured to provide a polling request to the network device driver in response to a receive request from an application. The network device driver is configured to identify a receive queue based, at least in part, on a packet flow identifier included in the polling request and to initiate polling. A network controller including a flow director is configured to select one or more received packets associated with the packet flow identifier and to store the selected packets in the receive queue. The flow director may be initialized with the packet flow identifier and a receive queue identifier. The network device driver is configured to poll the receive queue for received packets ready for processing and to process received packets. The network device driver may be configured to establish ownership of the receive queue and/or disable interrupts. The network device driver may be configured to notify the logical link controller when the packet processing is completed. The network device driver may further release ownership of the receive queue and enable interrupts when the packet processing is completed.

Thus, polling for received packets ready for processing may be performed by a network device driver utilizing a network controller that includes a flow director. Associating the receive queue with the packet flow identifier enables the network device driver to poll the appropriate receive queue. The network device driver may disable interrupts thereby eliminating effects of interrupt context switching and/or DPC (delayed procedure call) scheduling on latency. Disabling interrupts may further eliminate latencies associated with interrupt moderation.

Figure 1:
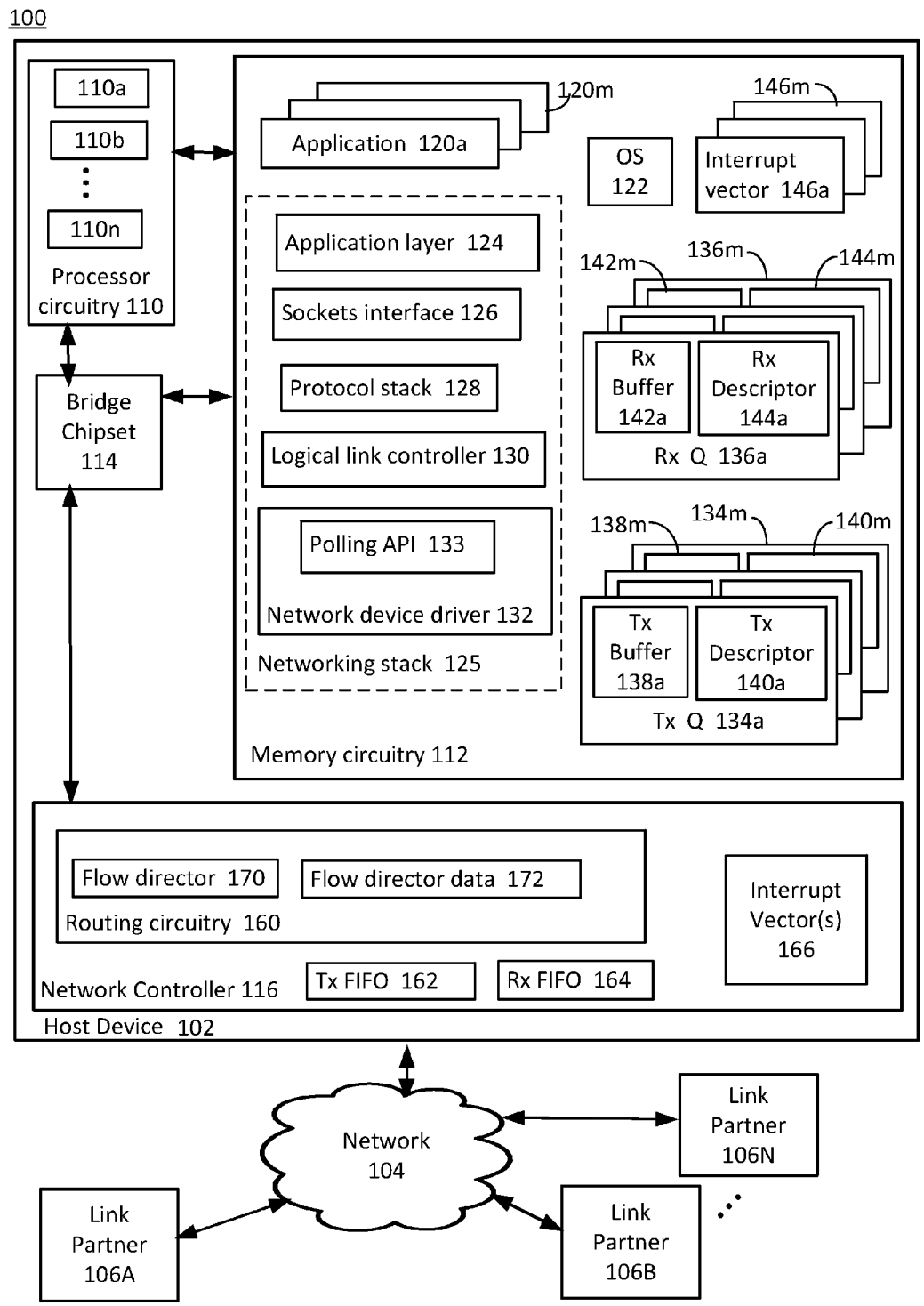
FIG. 1 illustrates one exemplary system embodiment consistent with the present disclosure.

FIG. 1 illustrates one exemplary system embodiment consistent with the present disclosure. System 100 generally includes a host device 102, a network 104 and a plurality of link partners 106A, 106B, . . . , 106N. The host device 102 may be configured to transmit messages and/or data via network 104 to link partners 106A, 106B, . . . , 106N and/or to receive messages and/or data from link partners 106A, 106B, . . . , 106N via network 104.

The host device 102 generally includes processor circuitry 110, memory circuitry 112, a bridge chipset 114 and a network controller 116. The processor circuitry 110 is coupled to the memory circuitry 112 and the bridge chipset 114. In some embodiments, the bridge chipset 114 may be included in processor circuitry 110. The bridge chipset 114 is coupled to the memory circuitry 112 and the network controller 116. The network controller 116 is configured to provide the host device 102 with network connectivity.

Processor circuitry 110 may include a plurality of processors and/or processor cores 110a, . . . , 110n. In some embodiments, e.g., a NUMA (non-uniform memory access) architecture, processor circuitry 110 may include the plurality of processors and/or processor cores 110a, . . . , 110n and memory circuitry 112 may include a plurality of node local memories. In these embodiments, a subset of processor cores 110a, . . . , 110n may be associated with (e.g., coupled to) a respective node local memory. Each node local memory may then include similar elements as are included in memory circuitry 112.

Memory circuitry 112 is configured to store one or more application(s) and/or thread(s) 120a, . . . , 120m, a networking stack 125 and an operating system OS 122. OS 122 may include, but is not limited to, a Microsoft® Windows® based operating system (e.g., Windows® Server 8 available from Microsoft® Corporation, Redmond, Wash.), a Linux based operating system (e.g., Linux, ESX, etc.), a UNIX based operating system (e.g., FreeBSD) and/or other operating systems. The OS 122 may be configured to allow polling receive queues for detecting received packets ready for processing. For example, Windows® Server 8 is configured to allow polling receive queues. Windows® Server 8 is further configured to allow allocating ("registering") receive queues prior to communication activity. This technique is configured to reduce latency during packet receive operations. It should be noted that while Windows® Server 8 is one example of an operating system that may utilize a system and method consistent with the present disclosure, the system and method is not limited to Windows® Server 8.

The application(s) and/or thread(s) 120a, . . . , 120m may be configured to send data and/or message(s) to, and to receive data and/or message(s) from, one or more of the link partner(s) 106A, 106B, . . . , 106N via network controller 116 and network 104. The data and/or message(s) may be put into packets for transmission or may be extracted from received packets, by for example, networking stack 125. Content and configuration of network traffic may depend on a network and/or communication protocol, e.g., TCP/IP, UDP, etc. Network traffic may include one or more packet flows. Normally, a packet flow includes one or more fields that permit identification. For example, the packet flow identifier for a TCP packet is typically a 5-tuple that includes a sequence of source IP address, destination IP address, source port number, destination port number and an IP protocol value (corresponding to TCP in this case).

Memory circuitry 112 includes one or more transmit queue(s) TxQ(s) 134a, . . . , 134m, and one or more receive queue(s) RxQ(s) 136a, . . . , 136m. In some embodiments, e.g., NUMA architecture, a transmit queue, e.g., Tx Q 134a, may be logically paired with a receive queue, e.g., Rx Q 136a, to form a Tx/Rx queue pair (QP). Each transmit queue 134a, . . . , 134m includes a transmit buffer 138a, . . . , 138m configured to store packets for transmission and a transmit descriptor 140a, . . . , 140m. Each receive queue 136a, . . . , 136m includes a receive buffer 142a, . . . , 142m configured to store received packets prior to protocol stack processing and a receive descriptor 144a, . . . , 144m. A packet flow identifier associated with packets to be transmitted may be included in a Tx descriptor, e.g., Tx descriptor 140a. The packet flow identifier may be stored in Tx descriptor 140a when the associated packets are stored in the respective transmit buffer, e.g., transmit buffer 138a. A packet flow identifier associated with receive packets may be included in a Rx descriptor, e.g., Rx descriptor 144a. The receive flow identifier may be stored in the Rx descriptor 144a when receive packets are retrieved from Rx FIFO 164 and stored in a respective receive buffer, e.g. receive buffer 138a, for processing. The Rx descriptors 144a, . . . , 144m may further include a field configured to indicate that a packet is ready for processing by, e.g., networking stack 125 and/or an application 120a, . . . , 120m. A network device driver configured to poll a receive queue for received packets may be configured to poll the associated receive descriptor and the packet ready field, as described herein.

Memory circuitry 112 may include one or more interrupt vector(s) 146a, . . . , 146m. Each queue (TxQ 134a, . . . , 134m and RxQ 136a, . . . , 136m) may be associated with a respective interrupt vector 146a, . . . , 146m. When polling is not implemented, the interrupt vector(s) 146a, . . . , 146m are configured to indicate a location of an interrupt service routine configured to process completed transmit requests and/or receive packets for delivery to an application.

Memory circuitry 112 is configured to store at least one networking stack 125 that may include an application layer 124, a sockets interface 126, a protocol stack 128, a logical link controller 130 and a network device driver 132. An application layer, e.g., application layer 124, is configured to provide an interface between the networking stack 125 and application(s) 120a, . . . , 120m. A sockets interface, e.g., sockets interface 126, corresponds to a programming interface that an application may use to send and receive data. The sockets interface 126 is configured to provide an interface between application layer 124 and the protocol stack 128. A protocol stack, e.g., protocol stack 128, may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network, e.g., network 104. Another example of a protocol stack is a UDP/IP (User Datagram Protocol/Internet Protocol) protocol stack. A protocol stack may alternatively be comprised on a dedicated sub-system such as, for example, a TCP offload engine and/or network controller 116.

The logical link controller 130 is configured to provide an interface between the protocol stack 128 and the network device driver 132. The logical link controller 130 is configured to receive a receive request from an application, e.g., application 120a, via sockets interface 126 and protocol stack 128. The receive request may include a packet flow identifier associated with the receive request. The packet flow identifier may be configured to identify a receive queue to be utilized for receiving packets associated with the packet flow identifier.

The receive request may further include an indicator corresponding to low latency networking. The low latency networking indicator is configured to inform the logical link controller 130 that the receive queue should be polled for received packets ready for processing if possible. The logical link controller 130 is configured to provide a corresponding hint to the network device driver 132 that the receive queue should be polled for received packets if possible. The hint is configured to allow the network device driver to initiate polling if possible. For example, polling may not be initiated if an interrupt service routine and/or a delayed procedure call are in process when the hint is received.

The logical link controller 130 may be configured to provide a filter identifier to the network controller 116, as described herein. The filter identifier may correspond to the packet flow identifier. For example, for a TCP/IP socket, a filter may correspond to a source IP address, a destination IP address, a source port number and a destination port number and may include an IP protocol value. The network controller 116 may then use the filter identifier when selecting packets for storage in the receive queue associated with the packet flow identifier.

The network device driver 132 may include a polling API (Application Programming Interface) 133. The polling API 133 is configured to provide an interface for an application, e.g., application 120a, to provide polling parameter(s) to network device driver 132 and thereby to network controller 116 (and flow director 170). Polling parameter(s) may include, but are not limited to, an identifier corresponding to the packet flow identifier (e.g., a filter identifier, a receive queue identifier), a duration of a polling interval (e.g., 50 μsec.), a maximum number (N) of packets to poll, a hint to maintain an associated interrupt disabled until enabled by the logical link controller 130 and/or a request to update a processor affinity of an associated interrupt vector. One or more of the polling parameter(s) may be provided to the network device driver 132. The polling parameters provided may depend on characteristics of the application 120a and/or the packet flow itself.

The network device driver 132 is configured to determine a flow director capability of network controller 116. For example, the network device driver 132 may be configured to determine a number of queues and/or a number of filters supported by the network controller 116 and/or flow director 170. The network device driver 132 may then be configured to communicate the capabilities of the network controller 116 to logical link controller 130.

If polling can be initiated, the network device driver 132 is configured to allocate a receive queue or a Tx/Rx queue pair configured to receive packets associated with the packet flow identifier. For example, a Tx/Rx queue pair may be allocated if it is desired for received packets to be processed on a core associated with transmit packets, e.g., a NUMA architecture. The network device driver 132 is further configured to program the flow director 170 to select received packets associated with the packet flow identifier for storage in the allocated receive queue, thus, enabling the network device driver 132 to poll the allocated receive queue. The network device driver 132 may be configured to notify the logical link controller 130 that the flow director 170 is programmed.

A flag may be utilized by an application configured to indicate to other applications whether a queue (e.g., Rx Q 136*a*) is being processed by the application. For example, a network device driver, e.g., network device driver 132, may be configured to set a queue flag when initiating polling in a selected receive queue. The set queue flag may then indicate to other applications that the selected receive queue is in use. The other applications are typically configured to avoid processing the same queue when this flag is set. The network device driver 132 may then be configured to clear the queue flag when the processing is complete. In some embodiments, the queue flag may be an atomic flag. Additionally or alternatively, a spinlock may be implemented on the selected queue. Spinlock and queue flags are configured to facilitate synchronization of queue utilization and to prevent race conditions.

The logical link controller 130 may be configured receive an indication that a receive packets operation has completed and to communicate this completion to the network device driver 132. The network device driver 132 may then remove the associated filter identifier from the network controller 116. Removing the associated filter identifier is configured to close a communication between the host device and a link partner. The network device driver 132 may then be configured to release the receive queue.

The network controller 116 may include routing circuitry 160, one or more transmit buffers Tx FIFO 162 and one or more receive buffers Rx FIFO 164. The transmit buffer(s) Tx FIFO 162 are configured to store packets prior to transmission and the receive buffer(s) Rx FIFO 164 are configured to store received packets. In some embodiments, the network controller 116 may be configured to store the interrupt vector(s) 166. While interrupts are enabled, the network controller 116 is configured to provide an interrupt to processor circuitry 110 when a packet is received or in response to completing transmission of a packet. The interrupt may be associated with interrupt vector(s) 166 and/or interrupt vector(s) 146. The particular interrupt vector utilized may related to the packet flow identifier. If polling is in process when an interrupt occurs, an interrupt service routine pointed to by an interrupt vector, is configured to return without scheduling a DPC (delayed procedure call). Thus, polling and host device interrupt service processing may be synchronized.

Routing circuitry 160 may include a flow director 170 and flow director data 172. Routing circuitry 160 is configured to store a filter identifier and/or a receive queue identifier in flow director data 172. For example, the filter identifier may correspond to a packet flow identifier. The filter identifier (i.e., packet flow identifier) and the receive queue identifier may be stored in flow director data 172 by network device driver 132. Flow director data 172 is configured to associate a packet flow with a receive queue stored in the memory circuitry 112. Flow director data 172 is configured to facilitate routing packets associated with a packet flow identifier to the receive queue associated with the packet flow thus enabling the network device driver to poll the appropriate receive queue.

The flow director 170 is configured to process received packets to identify a packet flow and to identify a receive queue associated with the identified packet flow. For example, when an application/thread has data/message(s) to transmit and packets corresponding to the data/message(s) to be transmitted are stored in a Tx/Rx Queue pair, the network device driver 132 may be configured to program flow director 170 to route received network traffic for the same packet flow to the same Tx/Rx Queue pair.

Thus, a host device that includes a networking stack and a network controller including a flow director may be configured to implement polling, by a network device driver, for received packets that are ready for processing. The flow director may be initialized with a packet flow identifier and a receive queue identifier thereby enabling polling since only packets associated with the packet flow identifier may be placed in the receive queue by the network controller. The flow director is then configured to provide received packets associated with the packet flow identifier to the identified receive queue. In some embodiments, the network device driver is configured to disable interrupts. The network device driver may then poll the receive queue for received packets ready for processing. Thus, latency variation may be avoided and latency may be reduced.

Figure 2:
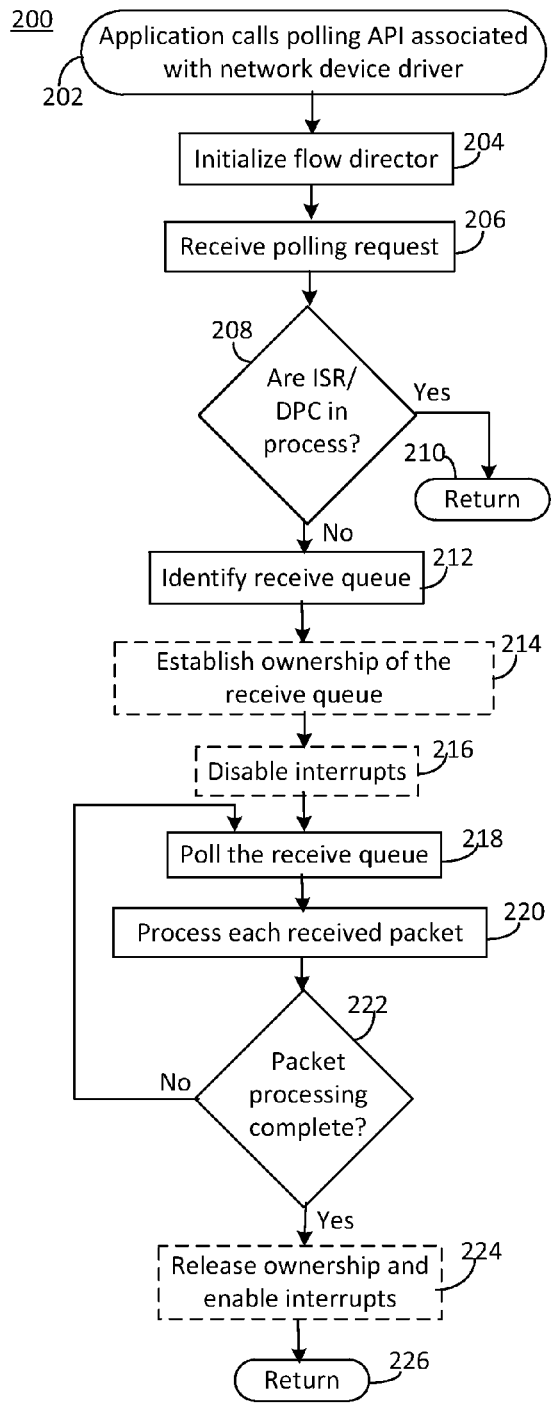
FIG. 2 is a flowchart illustrating example operations of a flow director-based networking system consistent with the present disclosure.

FIG. 2 is a flowchart 200 illustrating example operations of a flow director-based system consistent with the present disclosure. The operations may be performed, for example, by a network device driver and/or a logical link controller. In particular, flowchart 200 depicts exemplary operations configured to poll a receive queue by a network device driver in response to a receive request from an application. The operations of flowchart 200 may begin at operation 202, initiated in response to an application calling a polling API in a network device driver.

Operation 204 may include initializing a flow director. Operation 206 may include receiving a polling request. For example, the polling request may be received from a logical link controller in response to receiving a receive request from the application. Whether an interrupt service routine (ISR) or a delayed procedure call (DPC) are in process may be determined at operation 208. If the ISR or DPC are in process, then program flow may return at operation 210. Thus, polling may not be initiated when ISR and/or DPC are in process, providing synchronization between polling for received packet processing and interrupt driven received packet processing. If ISR and DPC are not in process, a receive queue ("Rx Q") to be polled may be identified at operation 212. For example, the receive queue may be identified based on information provided with the polling request by the logical link controller. In some embodiments, ownership of the identified receive queue may be established at operation 214. For example, a flag may be set configured to indicate to other applications that the receive queue is being used. In another example, a spinlock may be established.

In some embodiments, interrupts may be disabled at operation 216. Disabling interrupts is configured to prevent interrupt servicing and DPCs thereby reducing (or eliminating) latency variation due to ISR and DPC processing and/or interrupt moderation. Operation 218 includes polling the receive queue. For example, a receive descriptor field configured to indicate received packets ready for processing may be polled. Each received packet may be processed at operation 220. Whether packet processing is complete may be determined at operation 222. For example, an application may be configured to communicate when packet processing is complete via, e.g., logical link controller 130. If packet processing is not complete, program flow may return to operation 218, polling the receive queue. If packet processing is complete, ownership of the receive queue may be released and interrupts may be enabled at operation 224. Program flow may return at operation 226.

Thus, a network device driver may be configured to poll a receive queue for received packets associated with a packet flow identifier that are ready for processing. A flow director included in a network controller may be initialized with a filter corresponding to the packet flow identifier and with a receive queue identifier. The network controller may then be configured to place received packets associated with the packet flow identifier in the receive queue corresponding to the receive queue identifier. The network device driver may then poll the receive queue, e.g., a receive queue descriptor field configured to indicate received packets that are ready for processing. In some embodiments, interrupts may be disabled while the polling is occurring thus reducing any latency variation in received packet processing. Polling for received packets is configured to provide a relatively low latency receive packet processing, in general.

Figure 3:
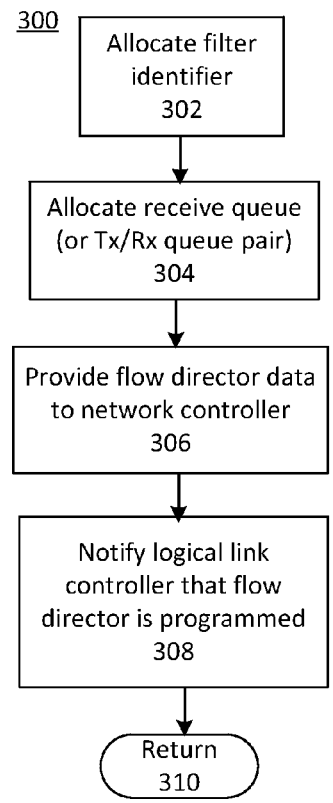
FIG. 3 is a flowchart illustrating example operations configured to initialize a flow director consistent with an embodiment of the present disclosure.

FIG. 3 is a flowchart 300 illustrating example operations configured to initialize a flow director consistent with an embodiment of the present disclosure. The operations may be performed, for example, by a network device driver and/or a logical link controller. In particular, flowchart 300 depicts exemplary operations configured to initialize a flow director to route packets associated with a packet flow identifier to a particular receive queue (Rx Q) or Tx/Rx queue pair (Tx/Rx QP). The operations of flowchart 300 correspond to operation 210 of FIG. 2. It is assumed that flow director capability and/or a number of queues and a number of filters supported by the network controller and/or flow director have been reported by the network device driver prior to the operations of flowchart 200 and flowchart 300. This reporting may occur during initialization of host device 102.

Program flow may begin with allocating a filter identifier at operation 302. For example, the filter identifier may be allocated by a logical link controller. The logical link controller may be further configured to determine whether a separate queue may be appropriate. An Rx Q (or Tx/Rx QP) may be allocated at operation 304. Operation 306 may include providing flow director data to a flow director at operation 306. Flow director data may include a packet flow identifier (e.g., a filter identifier) and/or an Rx Q identifier (or Tx/Rx QP identifier). Operation 308 may include notifying the logical link controller that the flow director is programmed. Program flow may then return at operation 310.

Thus, a filter identifier and/or an Rx Q identifier (or a Tx/Rx QP identifier) may be allocated and a flow director may be initialized with a packet flow identifier and an Rx Q identifier (or a Tx/Rx QP identifier). The flow director may then be configured to direct received packet associated with the packet flow identifier to the identified Rx Q (or Tx/Rx QP).

While FIGS. 2 and 3 illustrate various operations according to an embodiment, it is to be understood that not all of the operations depicted in FIGS. 2 and 3 are necessary for other embodiments. Indeed, it is fully contemplated herein that in other embodiments of the present disclosure, the operations depicted in FIGS. 2 and 3 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

While the foregoing is prided as exemplary system architectures and methodologies, modifications to the present disclosure are possible. For example, an operating system 122 in host memory circuitry may manage system resources and control tasks that are run on, e.g., host device 102. For example, OS 122 may be implemented using Microsoft Windows, HP-UX, Linux, BSD, ESX or UNIX, although other operating systems may be used. In one embodiment, OS 122 shown in FIG. 1 may be replaced by a virtual machine manager which may provide a layer of abstraction for underlying hardware to various operating systems running on one or more processing units.

Linux may comply or be compatible with ISO/IEC 23360-1:2006 Linux Standard Base (LSB) core specification 3.1—Part 1: Generic specification and other parts of this standard, released by International Organization for Standardization (ISO) and by the International Electrotechnical Commission (IEC), and/or later versions of this standard. BSD, an open-source operating system, may comply or be compatible with Release 9.0 (January 2012) of FreeBSD, maintained by the FreeBSD project, supported by the FreeBSD Foundation, and/or later releases. ESX may comply or be compatible with VMware ESX and/or VMware ESXi, release 5.1 (September, 2012), available from VMware, Inc., Palo Alto, Calif., and/or later releases.

Host device 102 and/or one or more of the link partners 106A, 106B, . . . , 106N may further include an operating system (OS, not shown) to manage system resources and control tasks that are run on, e.g., node 102. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine and/or network controller. The TCP offload engine circuitry may be configured to provide, for example, packet transport, packet segmentation, packet reassembly, error checking, transmission acknowledgements, transmission retries, etc., without the need for host CPU and/or software involvement.

Other modifications are possible. For example, memory circuitry may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory circuitry may comprise other and/or later-developed types of computer-readable memory. The host device 102 and/or one or more of the link partners 106A, 106B, . . . , 106N may further include a direct memory access engine (DMA) configured to provide memory read and/or write requests without the need for direct process involvement in such transactions.

Network 104 may comprise a packet switched network. Network controller 116 may be capable of communicating with link partner(s) 106A, . . . , 106N using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, network controller 116 may be capable of communicating with link partner(s) 106A, . . . , 106N, using an X.25 communications protocol. The X.25 communications protocol may comply or be compatible with a standard promulgated by the International Telecommunication Union-Telecommunication Standardization Sector (ITU-T). Alternatively or additionally, network controller 116 may be capable of communicating with link partner(s) 106A, . . . , 106N, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network controller 116 may be capable of communicating with link partner(s) 106A, . . . , 106N, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

A method and system are configured to implement polling by a network device driver. A logical link controller is configured to provide a polling request to the network device driver in response to a receive request from an application. The network device driver is configured to identify a receive queue based, at least in part, on a packet flow identifier included in the polling request and to initiate polling. A network controller including a flow director is configured to select one or more received packets associated with the packet flow identifier and to store the selected packets in the receive queue. The flow director may be initialized with the packet flow identifier and a receive queue identifier. The network device driver is configured to poll the receive queue for received packets and to process received packets. The network device driver may be configured to establish ownership of the receive queue and/or disable interrupts. The network device driver may be configured to notify the logical link controller when the packet processing is completed. The network device driver may further release ownership of the receive queue and enable interrupts when the packet processing is completed. Thus, polling for packet processing may be performed by a network device driver utilizing a network controller that includes a flow director. Associating the receive queue with the packet flow identifier enables the network device driver to poll the appropriate receive queue. The network device driver may disable interrupts thereby eliminating effects of interrupt context switching and/or DPC (delayed procedure call) scheduling on latency. Disabling interrupts may further eliminate latencies associated with interrupt moderation.

In one aspect there is provided a host device. The host device includes processor circuitry comprising at least one processor; memory circuitry configured to store an application, a receive queue and a networking stack comprising a network device driver; a network controller comprising a flow director, the network controller configured to couple the host device to at least one link partner and the flow director configured to store one or more selected received packets in the receive queue, the selecting based, at least in part, on a packet flow identifier; and a network device driver configured to identify the receive queue in response to a polling request comprising the packet flow identifier; poll the receive queue; and process each received packet stored in the receive queue.

Another example host device includes the forgoing components and the network device driver is further configured to initialize the flow director with the packet flow identifier and a receive queue identifier corresponding to the receive queue.

Another example host device includes the forgoing components and the network device driver is further configured to at least one of establish ownership of the receive queue and disable an interrupt associated with the receive queue.

Another example host device includes the forgoing components and the polling request comprises at least one of a duration of a polling interval, a maximum number of packets to poll, a hint to maintain an associated interrupt disabled until enabled by a logical link controller and a request to update a processor affinity of an associated interrupt vector.

Another example host device includes the forgoing components and the networking stack further comprises a logical link controller configured to provide the polling request in response to a receive request from the application.

Another example host device includes the forgoing components and the packet flow identifier corresponds to a filter identifier related to a filter stored in the flow director, the flow director configured to select one or more received packets based, at least in part, on the filter identifier.

Another example host device includes the forgoing components and the receive queue is included in a transmit/receive queue pair configured to facilitate receive packet processing by a same processor as is configured to perform transmit packet processing.

In another aspect there is provided a method. The method includes identifying a receive queue by a network device driver in response to a polling request comprising a packet flow identifier; storing one or more selected received packets in the receive queue by a flow director, the selecting based, at least in part, on the packet flow identifier; polling the receive queue by the network device driver; and processing each received packet stored in the receive queue.

Another example method includes the forgoing operations and further includes initializing the flow director with the packet flow identifier and a receive queue identifier corresponding to the receive queue.

Another example method includes the forgoing operations and further includes at least one of establishing ownership of the receive queue by the network device driver and disabling an interrupt associated with the receive queue.

Another example method includes the forgoing operations and further includes that the polling request comprises at least one of a duration of a polling interval, a maximum number of packets to poll, a hint to maintain an associated interrupt disabled until enabled by a logical link controller and a request to update a processor affinity of an associated interrupt vector.

Another example method includes the forgoing operations and further includes that the polling request is provided by a logical link controller in response to a receive request from an application.

Another example method includes the forgoing operations and further includes that the packet flow identifier corresponds to a filter identifier related to a filter stored in the flow director, the flow director configured to select one or more received packets based, at least in part, on the filter identifier.

Another example method includes the forgoing operations and further includes that the receive queue is included in a transmit/receive queue pair configured to facilitate receive packet processing by a same processor as is configured to perform transmit packet processing.

In another aspect there is provided a system. The system includes one or more storage mediums having stored thereon, individually or in combination, instructions that when executed by one or more processors, results in the following: identifying a receive queue by a network device driver in response to a polling request comprising a packet flow identifier; storing one or more selected received packets in the receive queue by a flow director, the selecting based, at least in part, on the packet flow identifier; polling the receive queue by the network device driver; and processing each received packet stored in the receive queue.

Another example system includes instructions that when executed by one or more processors result in the forgoing operations and also includes initializing the flow director with the packet flow identifier and a receive queue identifier corresponding to the receive queue.

Another example system includes instructions that when executed by one or more processors result in the forgoing operations and also includes at least one of establishing ownership of the receive queue by the network device driver and disabling an interrupt associated with the receive queue.

Another example system includes instructions that when executed by one or more processors result in the forgoing operations and also includes that the polling request comprises at least one of a duration of a polling interval, a maximum number of packets to poll, a hint to maintain an associated interrupt disabled until enabled by a logical link controller and a request to update a processor affinity of an associated interrupt vector.

Another example system includes instructions that when executed by one or more processors result in the forgoing operations and also includes that the polling request is provided by a logical link controller in response to a receive request from an application.

Another example system includes instructions that when executed by one or more processors result in the forgoing operations and also includes that the packet flow identifier corresponds to a filter identifier related to a filter stored in the flow director, the flow director configured to select one or more received packets based, at least in part, on the filter identifier.

Another example system includes instructions that when executed by one or more processors result in the forgoing operations and also includes that the receive queue is included in a transmit/receive queue pair configured to facilitate receive packet processing by a same processor as is configured to perform transmit packet processing.

In one aspect there is provided a host device. The host device includes processor circuitry comprising at least one processor; memory circuitry configured to store an application, a receive queue and a networking stack comprising a network device driver; a network controller comprising a flow director, the network controller configured to couple the host device to at least one link partner and the flow director configured to store one or more selected received packets in the receive queue, the selecting based, at least in part, on a packet flow identifier; and a network device driver configured to identify the receive queue in response to a polling request comprising the packet flow identifier; poll the receive queue; and process each received packet stored in the receive queue.

Another example host device includes the forgoing components and the network device driver is further configured to initialize the flow director with the packet flow identifier and a receive queue identifier corresponding to the receive queue.

Another example host device includes the forgoing components and the network device driver is further configured to at least one of establish ownership of the receive queue and disable an interrupt associated with the receive queue.

Another example host device includes the forgoing components and the polling request comprises at least one of a duration of a polling interval, a maximum number of packets to poll, a hint to maintain an associated interrupt disabled until enabled by a logical link controller and a request to update a processor affinity of an associated interrupt vector.

Another example host device includes the forgoing components and the networking stack further comprises a logical link controller configured to provide the polling request in response to a receive request from the application.

Another example host device includes the forgoing components and the packet flow identifier corresponds to a filter identifier related to a filter stored in the flow director, the flow director configured to select one or more received packets based, at least in part, on the filter identifier.

Another example host device includes the forgoing components and the receive queue is included in a transmit/receive queue pair configured to facilitate receive packet processing by a same processor as is configured to perform transmit packet processing.

In another aspect there is provided a method. The method includes identifying a receive queue by a network device driver in response to a polling request comprising a packet flow identifier; storing one or more selected received packets in the receive queue by a flow director, the selecting based, at least in part, on the packet flow identifier; polling the receive queue by the network device driver; and processing each received packet stored in the receive queue.

Another example method includes the forgoing operations and further includes initializing the flow director with the packet flow identifier and a receive queue identifier corresponding to the receive queue.

Another example method includes the forgoing operations and further includes at least one of establishing ownership of the receive queue by the network device driver and disabling an interrupt associated with the receive queue.

Another example method includes the forgoing operations and further includes that the polling request comprises at least one of a duration of a polling interval, a maximum number of packets to poll, a hint to maintain an associated interrupt disabled until enabled by a logical link controller and a request to update a processor affinity of an associated interrupt vector.

Another example method includes the forgoing operations and further includes that the polling request is provided by a logical link controller in response to a receive request from an application.

Another example method includes the forgoing operations and further includes that the packet flow identifier corresponds to a filter identifier related to a filter stored in the flow director, the flow director configured to select one or more received packets based, at least in part, on the filter identifier.

Another example method includes the forgoing operations and further includes that the receive queue is included in a transmit/receive queue pair configured to facilitate receive packet processing by a same processor as is configured to perform transmit packet processing.

In another aspect there is provided a system. The system includes one or more storage mediums having stored thereon, individually or in combination, instructions that when executed by one or more processors, results in the following: identifying a receive queue by a network device driver in response to a polling request comprising a packet flow identifier; storing one or more selected received packets in the receive queue by a flow director, the selecting based, at least in part, on the packet flow identifier; polling the receive queue by the network device driver; and processing each received packet stored in the receive queue.

Another example system includes instructions that when executed by one or more processors result in the forgoing operations and also includes initializing the flow director with the packet flow identifier and a receive queue identifier corresponding to the receive queue.

Another example system includes instructions that when executed by one or more processors result in the forgoing operations and also includes at least one of establishing ownership of the receive queue by the network device driver and disabling an interrupt associated with the receive queue.

Another example system includes instructions that when executed by one or more processors result in the forgoing operations and also includes that the polling request comprises at least one of a duration of a polling interval, a maximum number of packets to poll, a hint to maintain an associated interrupt disabled until enabled by a logical link controller and a request to update a processor affinity of an associated interrupt vector.

Another example system includes instructions that when executed by one or more processors result in the forgoing operations and also includes that the polling request is provided by a logical link controller in response to a receive request from an application.

Another example system includes instructions that when executed by one or more processors result in the forgoing operations and also includes that the packet flow identifier corresponds to a filter identifier related to a filter stored in the flow director, the flow director configured to select one or more received packets based, at least in part, on the filter identifier.

Another example system includes instructions that when executed by one or more processors result in the forgoing operations and also includes that the receive queue is included in a transmit/receive queue pair configured to facilitate receive packet processing by a same processor as is configured to perform transmit packet processing.

In one aspect there is provided a host device. The host device includes processor circuitry comprising at least one processor; memory circuitry configured to store an application, a receive queue and a networking stack comprising a network device driver; a network controller comprising a flow director, the network controller configured to couple the host device to at least one link partner and the flow director configured to store one or more selected received packets in the receive queue, the selecting based, at least in part, on a packet flow identifier; and a network device driver configured to identify the receive queue in response to a polling request comprising the packet flow identifier; poll the receive queue; and process each received packet stored in the receive queue.

Another example host device includes the forgoing components and the network device driver is further configured to initialize the flow director with the packet flow identifier and a receive queue identifier corresponding to the receive queue.

Another example host device includes the forgoing components and the network device driver is further configured to at least one of establish ownership of the receive queue and disable an interrupt associated with the receive queue.

Another example host device includes the forgoing components and the polling request comprises at least one of a duration of a polling interval, a maximum number of packets to poll, a hint to maintain an associated interrupt disabled until enabled by a logical link controller and a request to update a processor affinity of an associated interrupt vector.

Another example host device includes the forgoing components and the networking stack further comprises a logical link controller configured to provide the polling request in response to a receive request from the application.

Another example host device includes the forgoing components and the packet flow identifier corresponds to a filter identifier related to a filter stored in the flow director, the flow director configured to select one or more received packets based, at least in part, on the filter identifier.

Another example host device includes the forgoing components and the receive queue is included in a transmit/receive queue pair configured to facilitate receive packet processing by a same processor as is configured to perform transmit packet processing.

In another aspect there is provided a method. The method includes identifying a receive queue by a network device driver in response to a polling request comprising a packet flow identifier; storing one or more selected received packets in the receive queue by a flow director, the selecting based, at least in part, on the packet flow identifier; polling the receive queue by the network device driver; and processing each received packet stored in the receive queue.

Another example method includes the forgoing operations and further includes initializing the flow director with the packet flow identifier and a receive queue identifier corresponding to the receive queue.

Another example method includes the forgoing operations and further includes at least one of establishing ownership of the receive queue by the network device driver and disabling an interrupt associated with the receive queue.

Another example method includes the forgoing operations and further includes that the polling request comprises at least one of a duration of a polling interval, a maximum number of packets to poll, a hint to maintain an associated interrupt disabled until enabled by a logical link controller and a request to update a processor affinity of an associated interrupt vector.

Another example method includes the forgoing operations and further includes that the polling request is provided by a logical link controller in response to a receive request from an application.

Another example method includes the forgoing operations and further includes that the packet flow identifier corresponds to a filter identifier related to a filter stored in the flow director, the flow director configured to select one or more received packets based, at least in part, on the filter identifier.

Another example method includes the forgoing operations and further includes that the receive queue is included in a transmit/receive queue pair configured to facilitate receive packet processing by a same processor as is configured to perform transmit packet processing.

In one aspect there is provided a host device. The host device includes processor circuitry comprising at least one processor; memory circuitry configured to store an application, a receive queue and a networking stack comprising a network device driver; a network controller comprising a flow director, the network controller configured to couple the host device to at least one link partner and the flow director configured to store one or more selected received packets in the receive queue, the selecting based, at least in part, on a packet flow identifier; and a network device driver configured to identify the receive queue in response to a polling request comprising the packet flow identifier; poll the receive queue; and process each received packet stored in the receive queue.

Another example host device includes the forgoing components and the network device driver is further configured to initialize the flow director with the packet flow identifier and a receive queue identifier corresponding to the receive queue.

Another example host device includes the forgoing components and the network device driver is further configured to at least one of establish ownership of the receive queue and disable an interrupt associated with the receive queue.

Another example host device includes the forgoing components and the polling request comprises at least one of a duration of a polling interval, a maximum number of packets to poll, a hint to maintain an associated interrupt disabled until enabled by a logical link controller and a request to update a processor affinity of an associated interrupt vector.

Another example host device includes the forgoing components and the networking stack further comprises a logical link controller configured to provide the polling request in response to a receive request from the application.

Another example host device includes the forgoing components and the packet flow identifier corresponds to a filter identifier related to a filter stored in the flow director, the flow director configured to select one or more received packets based, at least in part, on the filter identifier.

Another example host device includes the forgoing components and the receive queue is included in a transmit/receive queue pair configured to facilitate receive packet processing by a same processor as is configured to perform transmit packet processing.

In another aspect there is provided a method. The method includes identifying a receive queue by a network device driver in response to a polling request comprising a packet flow identifier; storing one or more selected received packets in the receive queue by a flow director, the selecting based, at least in part, on the packet flow identifier; polling the receive queue by the network device driver; and processing each received packet stored in the receive queue.

Another example method includes the forgoing operations and further includes initializing the flow director with the packet flow identifier and a receive queue identifier corresponding to the receive queue.

Another example method includes the forgoing operations and further includes at least one of establishing ownership of the receive queue by the network device driver and disabling an interrupt associated with the receive queue.

Another example method includes the forgoing operations and further includes that the polling request comprises at least one of a duration of a polling interval, a maximum number of packets to poll, a hint to maintain an associated interrupt disabled until enabled by a logical link controller and a request to update a processor affinity of an associated interrupt vector.

Another example method includes the forgoing operations and further includes that the polling request is provided by a logical link controller in response to a receive request from an application.

Another example method includes the forgoing operations and further includes that the packet flow identifier corresponds to a filter identifier related to a filter stored in the flow director, the flow director configured to select one or more received packets based, at least in part, on the filter identifier.

Another example method includes the forgoing operations and further includes that the receive queue is included in a transmit/receive queue pair configured to facilitate receive packet processing by a same processor as is configured to perform transmit packet processing.

In one aspect there is provided a system. The system includes means for identifying a receive queue by a network device driver in response to a polling request comprising a packet flow identifier; means for storing one or more selected received packets in the receive queue by a flow director, the selecting based, at least in part, on the packet flow identifier; means for polling the receive queue by the network device driver; and means for processing each received packet stored in the receive queue.

Another example system includes the forgoing components and includes the means for initializing the flow director with the packet flow identifier and a receive queue identifier corresponding to the receive queue.

Another example system includes the forgoing components and includes the means for at least one of establishing ownership of the receive queue by the network device driver and disabling an interrupt associated with the receive queue.

Another example system includes the forgoing components and includes that the polling request comprises at least one of a duration of a polling interval, a maximum number of packets to poll, a hint to maintain an associated interrupt disabled until enabled by a logical link controller and a request to update a processor affinity of an associated interrupt vector.

Another example system includes the forgoing components and includes that the polling request is provided by a logical link controller in response to a receive request from an application.

Another example system includes the forgoing components and includes that the packet flow identifier corresponds to a filter identifier related to a filter stored in the flow director, the flow director configured to select one or more received packets based, at least in part, on the filter identifier.

Another example system includes the forgoing components and includes that the receive queue is included in a transmit/receive queue pair configured to facilitate receive packet processing by a same processor as is configured to perform transmit packet processing.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A host device comprising:
   processor circuitry comprising at least one processor;
   memory circuitry configured to store an application, a receive queue and a networking stack comprising a network device driver; and
   a network controller comprising a flow director, the network controller configured to couple the host device to at least one link partner and the flow director storing one or more selected received packets in the receive queue, wherein selecting of the selected received packets is based, at least in part, on a packet flow identifier,
   wherein the network device driver is configured to:
      identify the receive queue in response to a polling request comprising the packet flow identifier;
      establish ownership of the receive queue;
      poll the receive queue; and
      process each received packet stored in the receive queue.

2. The host device of claim 1, wherein the network device driver is further configured to initialize the flow director with the packet flow identifier and a receive queue identifier corresponding to the receive queue.

3. The host device of claim 1, wherein the network device driver is further configured to disable an interrupt associated with the receive queue.

4. The host device of claim 1, wherein the polling request comprises at least one of a duration of a polling interval, a maximum number of packets to poll, a hint to maintain an associated interrupt disabled until enabled by a logical link controller and a request to update a processor affinity of an associated interrupt vector.

5. The host device of claim 1, wherein the networking stack further comprises a logical link controller configured to provide the polling request in response to a receive request from the application.

6. The host device of claim 1, wherein the packet flow identifier corresponds to a filter identifier related to a filter stored in the flow director, the flow director configured to select one or more received packets based, at least in part, on the filter identifier.

7. The host device of claim 1, wherein the receive queue is included in a transmit/receive queue pair configured to facilitate receive packet processing by a same processor as is configured to perform transmit packet processing.

8. A method comprising:
   identifying a receive queue by a network device driver in response to a polling request comprising a packet flow identifier;
   establishing ownership of the receive queue by the network device driver;
   storing one or more selected received packets in the receive queue by a flow director, the selecting based, at least in part, on the packet flow identifier;
   polling the receive queue by the network device driver; and
   processing each received packet stored in the receive queue.

9. The method of claim 8, further comprising initializing the flow director with the packet flow identifier and a receive queue identifier corresponding to the receive queue.

10. The method of claim 8, further comprising disabling an interrupt associated with the receive queue.

11. The method of claim 8, wherein the polling request comprises at least one of a duration of a polling interval, a maximum number of packets to poll, a hint to maintain an associated interrupt disabled until enabled by a logical link controller and a request to update a processor affinity of an associated interrupt vector.

12. The method of claim 8, wherein the polling request is provided by a logical link controller in response to a receive request from an application.

13. The method of claim 8, wherein the packet flow identifier corresponds to a filter identifier related to a filter stored in the flow director, the flow director configured to select one or more received packets based, at least in part, on the filter identifier.

14. The method of claim 8, wherein the receive queue is included in a transmit/receive queue pair configured to facilitate receive packet processing by a same processor as is configured to perform transmit packet processing.

15. A system comprising, one or more storage mediums having stored thereon, individually or in combination, instructions that when executed by one or more processors result in the following operations comprising:
   identifying a receive queue by a network device driver in response to a polling request comprising a packet flow identifier;
   establishing ownership of the receive queue by the network device driver;

storing one or more selected received packets in the receive queue by a flow director, the selecting based, at least in part, on the packet flow identifier;

polling the receive queue by the network device driver; and processing each received packet stored in the receive queue.

16. The system of claim 15, wherein the instructions that when executed by one or more processors results in the following additional operations comprising: initializing the flow director with the packet flow identifier and a receive queue identifier corresponding to the receive queue.

17. The system of claim 15, wherein the instructions that when executed by one or more processors results in the following additional operations comprising: disabling an interrupt associated with the receive queue.

18. The system of claim 15, wherein the polling request comprises at least one of a duration of a polling interval, a maximum number of packets to poll, a hint to maintain an associated interrupt disabled until enabled by a logical link controller and a request to update a processor affinity of an associated interrupt vector.

19. The system of claim 15, wherein the polling request is provided by a logical link controller in response to a receive request from an application.

20. The system of claim 15, wherein the packet flow identifier corresponds to a filter identifier related to a filter stored in the flow director, the flow director configured to select one or more received packets based, at least in part, on the filter identifier.

21. The system of claim 15, wherein the receive queue is included in a transmit/receive queue pair configured to facilitate receive packet processing by a same processor as is configured to perform transmit packet processing.

22. The host device of claim 1, wherein the network device driver is further configured to determine if an interrupt service routine (ISR) or a delayed procedure call (DPC) are in process and to not initiate polling when the ISR or DPC are determined to be in process.

* * * * *